US008529995B2

(12) United States Patent
Eberling-Fux et al.

(10) Patent No.: US 8,529,995 B2
(45) Date of Patent: Sep. 10, 2013

(54) METHOD FOR PRODUCING PARTS MADE OF A THERMOSTRUCTURAL COMPOSITE MATERIAL

(75) Inventors: Nicolas Eberling-Fux, Talence (FR); Eric Bouillon, Le Haillan (FR); Eric Philippe, Merignac (FR); Henri Tawil, Le Bouscat (FR)

(73) Assignee: Snecma Propulsion Solide, Le Haillan Cedex (FR)

( * ) Notice: Subject to any disclaimer, the term of this patent is extended or adjusted under 35 U.S.C. 154(b) by 111 days.

(21) Appl. No.: 13/121,278

(22) PCT Filed: Sep. 23, 2009

(86) PCT No.: PCT/FR2009/051804
§ 371 (c)(1),
(2), (4) Date: Mar. 28, 2011

(87) PCT Pub. No.: WO2010/034937
PCT Pub. Date: Apr. 1, 2010

(65) Prior Publication Data
US 2011/0200748 A1    Aug. 18, 2011

(30) Foreign Application Priority Data
Sep. 29, 2008    (FR) ...................................... 08 56530

(51) Int. Cl.
*C23C 16/00*    (2006.01)
(52) U.S. Cl.
USPC ........................................ 427/249.2; 427/181
(58) Field of Classification Search
USPC ................................................ 427/249.2, 181
See application file for complete search history.

(56) References Cited

U.S. PATENT DOCUMENTS

| 5,486,379 | A | * | 1/1996 | Bouillon et al. ............... 427/212 |
| 5,733,655 | A | | 3/1998 | Bors et al. |
| 5,965,266 | A | | 10/1999 | Goujard et al. |
| 6,068,930 | A | | 5/2000 | Lamouroux et al. |
| 6,291,058 | B1 | | 9/2001 | Goujard et al. |

(Continued)

FOREIGN PATENT DOCUMENTS

| EP | 0 626 360 | 11/1994 |
| EP | 0 634 378 A1 | 1/1995 |

(Continued)

OTHER PUBLICATIONS

International Search Report as issued for PCT/FR2009/051804.

(Continued)

*Primary Examiner* — Elizabeth Burkhart
(74) *Attorney, Agent, or Firm* — Pillsbury Winthrop Shaw Pittman, LLP

(57) ABSTRACT

A method of fabricating a thermostructural composite material part includes making a fiber preform formed of yarns or tows and impregnated by a consolidating composition containing a carbon- or ceramic-precursor, transforming the carbon- or ceramic-precursor by pyrolysis, and then densifying the preform by chemical vapor infiltration. A consolidating composition is used that additionally contains refractory solid fillers in the powder form presenting mean grain size less than 200 nanometers and leaving, after pyrolysis, a consolidated solid phase in which the carbon or the ceramic derived from the precursor occupies a volume representing 3% to 10% of the apparent volume of the preform, and the solid fillers occupy a volume representing 0.5% to 5% of the apparent volume of the preform.

9 Claims, 2 Drawing Sheets

(56) References Cited

U.S. PATENT DOCUMENTS

| | | | | |
|---|---|---|---|---|
| 8,039,053 | B2 * | 10/2011 | Philippe et al. | 427/249.2 |
| 2003/0136502 | A1 * | 7/2003 | Lavasserie et al. | 156/253 |
| 2003/0162647 | A1 | 8/2003 | Muhlratzer | |
| 2006/0141154 | A1 * | 6/2006 | Thebault | 427/249.2 |

FOREIGN PATENT DOCUMENTS

| | | |
|---|---|---|
| EP | 1 227 071 A2 | 7/2002 |
| FR | 2 778 655 | 11/1999 |
| FR | 08 54937 | 1/2010 |
| JP | 03-183659 | 8/1991 |
| JP | 04-272803 | 9/1992 |
| WO | WO 92/19567 | 11/1992 |
| WO | WO 2004/069769 A1 | 8/2004 |
| WO | WO 2006/067184 A1 | 6/2006 |
| WO | WO 2006090087 * | 8/2006 |
| WO | WO 2008/050068 A2 | 5/2008 |
| WO | WO 2008/104692 | 9/2008 |

OTHER PUBLICATIONS

Japanese Office Action dated May 21, 2013 for Appln. No. 2011-528397.

* cited by examiner

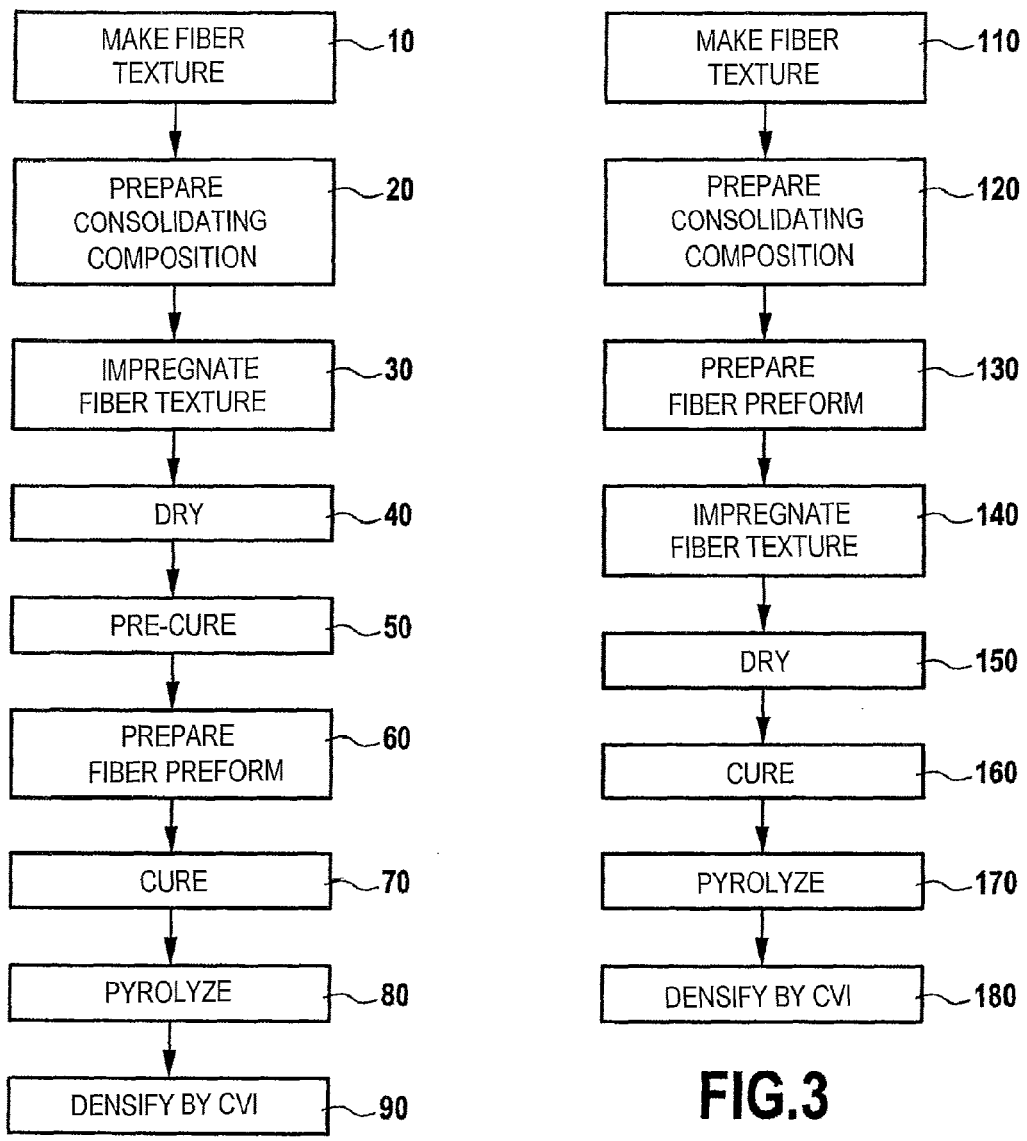
FIG.1
FIG.3
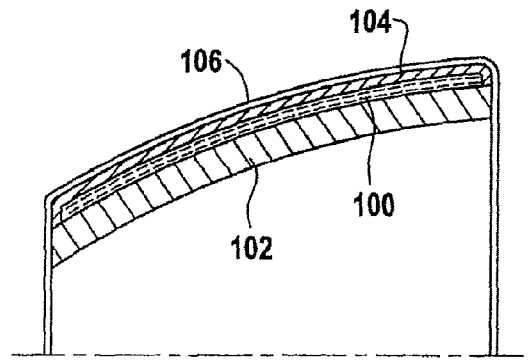
FIG.2

METHOD FOR PRODUCING PARTS MADE OF A THERMOSTRUCTURAL COMPOSITE MATERIAL

CROSS REFERENCE TO RELATED APPLICATIONS

This application is the U.S. National Stage of PCT/FR2009/051804 filed Sep. 23, 2009, which in turn claims priority to French Application No. 0856530, filed Sep. 29, 2008. The contents of both applications are incorporated herein by reference in their entirety.

BACKGROUND OF THE INVENTION

The invention relates to fabricating thermostructural composite material parts, in particular parts for use in the field of aviation or in the field of space. Examples of such parts are afterbody elements for gas turbine aeroengines, such as mixers or secondary nozzles of multiple-flow engines or central bodies or "plugs".

Thermostructural composite materials are remarkable for their mechanical properties, which make them suitable for constituting structural parts, and for their ability to conserve these properties at high temperatures. Well-known thermostructural composite materials are carbon/carbon (C/C) composites, comprising carbon fiber reinforcement with a carbon matrix, and ceramic matrix composites (CMC) comprising refractory fiber reinforcement (carbon fiber or ceramic fiber) and a ceramic matrix. CMCs present not only very good mechanical strength at high temperature, but also good ability to withstand a corrosive environment (the presence of oxidizers and moisture). Use of CMCs has therefore already been proposed for the afterbody elements of aeroengines that are subjected in operation to temperatures generally lying in the range 400° C. to 750° C.

One known process for fabricating a thermostructural composite material part comprises the following steps:
- making a fiber preform out of yarns (or tows) of carbon or of ceramic impregnated by a consolidating composition containing a carbon- or ceramic-precursor, generally a resin that is optionally diluted in a solvent;
- transforming the carbon- or ceramic-precursor by pyrolysis; and then
- densifying the preform by chemical vapor infiltration (CVI).

In order to make the impregnated fiber preform, one or more plies of fiber texture are used, e.g. a three-dimensional (3D) woven fabric, impregnated with the consolidating composition, and the fiber texture is shaped, e.g. by being draped on conformation tooling, so as to obtain a preform having a shape that corresponds to the shape of the part to be fabricated. The resin of the consolidating composition is cured and then pyrolyzed so as to leave a solid carbon or ceramic residue that serves to consolidate the preform. The consolidated preform is densified with a carbon or ceramic matrix obtained by CVI. In well-known manner, CVI densification is performed by placing the consolidated preform in a reaction chamber and by introducing a reaction gas into the chamber, the reaction gas containing one or more carbon- or ceramic-precursors, with conditions in the reaction chamber, in particular pressure and temperature conditions, being selected so as to enable the reaction gas to diffuse within the pores of the preform and form therein a solid deposit of carbon or ceramic by decomposition of one or more of the components of the reaction gas or by reaction between a plurality of its components.

The impregnation with the consolidating composition needs to be performed so as to be sufficient to obtain the quantity of solid residue after pyrolysis that is necessary for satisfactory consolidation. The term "satisfactory consolidation" is used herein to mean partial densification of the fiber preform that reaches or slightly exceeds a threshold beyond which the preform on its own conserves its shape and may be handled, if necessary, without requiring tooling to hold it. The Applicant has observed that sufficient consolidation is generally obtained with the solid residue after pyrolysis has a volume percentage of 12% to 14% (i.e. the percentage of the apparent volume of the preform that is occupied by the solid residue).

Mechanical tests performed on CMC parts obtained in this way by consolidation using a liquid technique with a ceramic precursor resin and densification by CVI have given results that are satisfactory from a thermomechanical point of view, but for which it may be desirable to obtain improvements concerning the Young's modulus of the material. The Applicant has observed that because of the quantity of consolidating composition that is required, a large portion of the intra-yarn spaces is occupied by the solid residue of pyrolysis, thereby imparting mechanical properties that are not as good as those provided by the ceramic matrix obtained by CVI.

OBJECT AND SUMMARY OF THE INVENTION

An object of the invention is to propose a method of fabricating thermostructural composite material parts having greatly increased mechanical potential, while associating consolidation by a liquid technique and densification by CVI.

This object is achieved by a method of fabricating a thermostructural composite material part, the method comprising making a fiber preform formed of yarns or tows, consolidating the fiber preform in its shape, and then densifying the consolidated fiber preform by chemical vapor infiltration, the consolidation being performed by impregnating the yarns or tows of the fiber preform with a consolidating composition containing a carbon- or ceramic-precursor and by transforming the carbon- or ceramic-precursor by pyrolysis, in which method a consolidating composition is used that further contains refractory solid fillers in the form of a powder of mean grain size less than 200 nanometers and that leaves, after pyrolysis, a consolidating solid phase in which the carbon or ceramic derived from the precursor occupies a volume representing 3% to 10% of the apparent volume of the preform and the solid fillers occupy a volume representing 0.5% to 5% of the apparent volume of the preform.

The presence of submicrometric fillers in the consolidating liquid composition provides the following advantages:
- the consolidating composition has less tendency to penetrate into the intra-yarn or intra-tow spaces of low porosity, thereby releasing a large portion of these spaces for CVI densification and thus making it possible in each yarn or tow to achieve a "mini-composite" having high-grade mechanical properties; and
- the solid residue of pyrolysis is reinforced by the presence of fillers, thereby increasing its mechanical properties and its capacity for consolidation.

Consequently, in comparison with the above-described state of the art, a smaller quantity of carbon- or ceramic-precursor in the consolidating composition suffices to achieve satisfactory consolidation, it being possible to reduce the volume percentage in the preform of the solid residue of pyrolyzing the consolidating phase so that it lies in the range 3% to 10%, and preferably in the range 3% to 6%.

The quantity of solid fillers in the consolidating composition must not be excessive in order to avoid increasing its viscosity or using a large quantity of solvent that can give rise to environmental and working problems. The volume percentage in the preform of solid fillers from the consolidating phase thus lies in the range 0.5% to 5%, and preferably in the range 0.5% to 3%.

The grain size of the solid fillers is selected to be small enough to avoid a filtering phenomenon occurring when the consolidating composition is put into place, with the solid fillers agglomerating at the peripheries of the yarns or tows and the liquid carbon- or ceramic-precursor penetrating alone into the yarns or tows. Thus, this grain size is on average less than 200 nanometers, or even less than 100 nanometers.

According to a feature of the method, the fiber preform is made by conforming a fiber texture formed of yarns or tows and impregnated by the consolidating composition. When the carbon- or ceramic-precursor in the consolidating composition is a resin, the fiber temperature is advantageously conformed after the resin has been pre-cured.

According to another feature of the method, an interphase layer is formed by chemical vapor infiltration on the fibers of the yarns or tows prior to impregnation with the consolidating composition.

According to yet another feature of the method, a first interphase layer is formed by chemical vapor infiltration on the fibers of the yarns or tows prior to impregnation by the consolidating composition, and a second interphase layer is formed after consolidation of the fiber preform and prior to densification of the consolidated fiber preform.

BRIEF DESCRIPTION OF THE DRAWINGS

Other features and advantages of the invention appear on reading the following description given by way of non-limiting indication with reference to the accompanying drawings, in which:

FIG. 1 shows the successive steps of a method of fabricating a part out of thermostructural composite material in an implementation of the invention;

FIG. 2 is a highly diagrammatic axial half-section showing the conformation of a fiber preform in order to fabricate a nozzle element of an aeroengine;

FIG. 3 shows the successive steps of a method of fabricating a part out of thermostructural composite material in another implementation of the invention;

DETAILED DESCRIPTION OF IMPLEMENTATIONS

Figure 4:
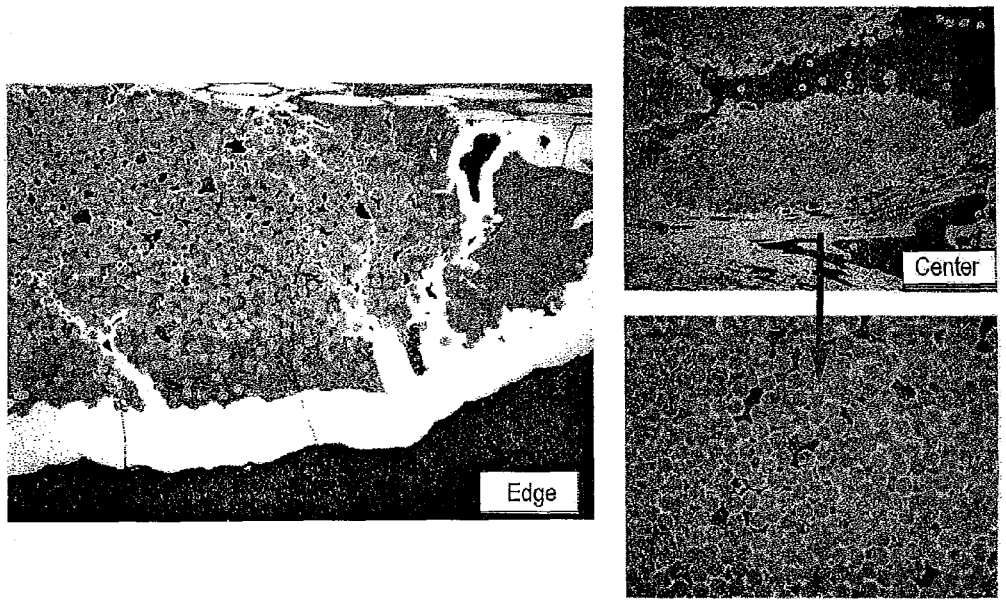
FIG. 4 shows optical images at the edge and in the core of a sample of CMC material obtained by a method of the invention.

An implementation of a method of the invention is described below with reference to FIG. 1 in the context of fabricating a part out of thermostructural composite material of the CMC type.

A step 10 of the method consists in making a fiber texture out of carbon or ceramic fibers from which a preform may be prepared for a part that is to be fabricated.

The fiber texture is formed from yarns or tows (referred to below as "yarns") of carbon or ceramic fibers or of carbon- or ceramic-precursor fibers, with the carbon- or ceramic-precursor then being transformed by heat treatment after the fiber texture has been formed.

The fiber texture may be in the form of a woven fabric, in particular a fabric obtained by three-dimensional (3D) weaving, thus making it possible to obtain a fiber texture of relatively great thickness having a plurality of layers of yarns that are linked together.

Other textile processes may be used for forming the fiber texture, such as for example: braiding, knitting, or forming multidirectional sheets by superposition in different directions and bonding the sheets of unidirectional fibers together, with the bonding being performed for example by stitching.

Another step 20 of the method consists in preparing a consolidating composition in liquid form, comprising a ceramic precursor, typically a resin, together with solid fillers in the form of ceramic powder(s). The consolidated composition may also contain a dispersant for the solid fillers, a solvent for the resin, and a solvent for the dispersant (if a common solvent is not available), the quantity of solvent(s) being adjusted to impart viscosity to the composition that is appropriate for impregnating the fiber texture.

Ceramic precursor, in particular precursors in the form of resin, are well known. Thus, a silicon carbide (SiC) precursor resin may be selected from polysiloxane resins, polysilazane resins, and polycarbosilane resins.

The solid fillers are constituted by one or more ceramic powders, e.g. selected from powders of silicon carbide SiC, titanium carbide TiC, boron carbide $B_4C$, and boron nitride BN. According to a characteristic of the method, the grain size is selected to be relatively small, on average less than 200 nanometers, or even preferably less than 100 nanometers, depending on the grain sizes available for the selected ceramic powders.

The term grain size is used herein to mean the mean dimension or diameter of the grains of powder.

In step 30, the fiber texture is impregnated with the consolidating composition. The respective quantities of ceramic precursor and of ceramic powder(s) in the consolidating composition, and also the quantity of consolidating composition that is introduced into the texture are selected so that after transformation of the precursor into a solid ceramic residue the fiber preform presents:

a ceramic residue volume percentage in the preform lies in the range 3% to 10%, preferably in the range 3% to 6%; and the ceramic powder volume percentage in the preform lies in the range 0.5% to 5%, and preferably in the range 0.5% to 3%.

The term "volume percentage" is used herein to mean the occupied fraction, expressed as a percentage of the total apparent volume of the preform.

The fiber texture may be impregnated by application with a brush or by spreading or by immersion in a bath, possibly under a vacuum, or indeed by injecting the consolidating composition while applying a vacuum.

Knowing the apparent volume of the consolidated preform that is to be obtained and the volume fraction of the solid residue of pyrolysis for the ceramic precursor used, it is easy to determine the quantity of precursor that needs to be used in order to obtain a desired ceramic residue volume percentage in the preform. Knowing the apparent volume of the consolidated preform that is to be obtained, it is also easy to determine the quantity of ceramic powder(s) that needs to be used in order to obtain a desired ceramic powder volume percentage in the preform. Knowing the quantities of ceramic precursor and of ceramic powder(s) to be used, the quantities of any dispersant and of solvent(s) can easily be determined for ensuring that the powder(s) is properly disposed and for conferring viscosity on the consolidating composition that is appropriate for impregnating the fiber texture.

After impregnation, a drying step 40 may be performed (eliminating any solvents) followed by a pre-curing step 50 in which the ceramic-precursor resin is pre-cured. The term "pre-curing" of the resin is used to mean taking the resin to a state that is intermediate between a non-cured resin and a fully-cured resin. The idea is to impart greater stiffness to the fiber texture, while conserving the deformability that is required to be able to conform it and thus make the preform for the part to be fabricated. It is thus possible to impart the fiber texture with improved ability to conserve its shape after deformation while it is being conformed, and to make it easier to put into place any discrete connections (stitching, implanting bonding elements), it being understood that such pre-curing might not be useful in all circumstances.

Preparation of the fiber preform for the part to be fabricated (step 60) may include cutting out plies or panels from the impregnated fiber texture and shaping them on a tooling element presenting a shape that corresponds to the shape of the part that is to be fabricated. It should be observed that the fiber texture may be impregnated after such plies or panels have been cut out.

Depending on the complexity of the shape to be given to the fiber preform, on the capacity of the fiber texture to deform without giving rise to significant surface irregularities, and on the thickness of the fiber preform, preparation thereof may comprise one or more of the following operations:

draping (shaping) a fiber texture ply on the tooling element;
draping a plurality of superposed plies, not necessarily having the same dimensions when the fiber preform presents varying thickness; and
cutting out fiber texture panels and placing the panels on the tooling element with their edges adjacent, possibly with their edges overlapping mutually.

The superposed plies or adjacent edges of fiber texture panels may be bonded together by stitching or by implanting bonding elements such as yarns.

The fiber preform may be held in the desired shape on the conformation tooling element by means of a diaphragm, e.g. an elastomer diaphragm forming a backing mold and applied to the outside surface of the preform.

FIG. 2 shows a fiber preform 100, e.g. for fabricating a downstream element of a secondary nozzle out of CMC for an aeroengine comprising a bypass gas turbine. The preform 100 is prepared by draping one or more plies of fiber texture on a mandrel 102 and it is held in the desired shape by means of an elastomer diaphragm 104.

Fiber preforms of more complex shape requiring operations of draping and bonding cut-out panels and plies may be prepared, e.g. as described in patent application PCT/FR2008/050207 for a lobed mixer of a bypass gas turbine aeroengine.

After preparing the fiber texture, curing of the ceramic precursor resin is completed (step 70).

The fiber preform may then be removed from the conformation tooling in order to be subjected to heat treatment for pyrolyzing the resin (step 80). Such heat treatment is usually performed at a temperature lying in the range 700° C. to 1000° C., e.g. about 900° C., for one to several hours.

A fiber preform is then obtained that is consolidated by the ceramic residue of pyrolysis of the precursor contained in the consolidating composition, the ceramic residue itself being reinforced by the ceramic powder(s).

The fiber preform as consolidated in this way is then densified with a ceramic matrix by CVI (step 90). CVI processes for densifying a porous substrate with a ceramic matrix are well known. Advantageously, the densification is performed by a ceramic matrix that is at least in part self-healing, i.e. capable of plugging any cracks in the matrix by taking on a pasty state at utilization temperatures. Methods of forming ceramic matrices, in particular self-healing matrices, are described in documents U.S. Pat. No. 5,965,266, U.S. Pat. No. 6,068,930, and U.S. Pat. No. 6,291,058, for example.

It should be observed that if a $B_4C$ powder is present in the solid fillers of the consolidated composition, this powder may contribute to the self-healing function by forming glass in the presence of oxygen.

Since CVI densification is performed at a temperature that is higher than the temperature for pyrolyzing the ceramic precursor of the consolidating composition, steps 80 and 90 may follow on one from the other in the same oven, with pyrolysis then being performed during the temperature rise prior to the beginning of CVI densification.

As mentioned above, the method of the invention is remarkable in that compared with known consolidation processes using a liquid technique, effective consolidation can be obtained with:

a smaller quantity of ceramic precursor in the consolidating composition; and
a greater available volume inside the yarns for the ceramic matrix that is obtained by CVI.

This results from the presence in the consolidating composition of solid fillers in the form of a ceramic powder of relatively small grain size, which fillers:

provide a function of reinforcing the ceramic precursor residue contained in the consolidating composition and thus improve consolidation capacity; and
ensure that the consolidating composition, and in particular the ceramic precursor it contains, penetrates with greater difficulty into the intra-yarn empty spaces (internal volumes of the yarn); it is nevertheless necessary for this purpose that the grain size of the solid fillers is relatively small, as mentioned above, in order to avoid an effect of the yarns filtering the consolidating composition.

Another implementation of the method of the invention is shown in FIG. 3, this other implementation differing from that of FIG. 1 in that the fiber texture is impregnated after the preform has been prepared.

There are steps 110 and 120 of making a fiber texture and of preparing a consolidating composition that are analogous to the steps 10 and 20 of the method of FIG. 1.

In a step 130, the fiber preform is prepared from plies and/or panels of dry fiber texture, in a manner similar to that described above with reference to step 60 of the method of FIG. 1.

In step 140, the fiber preform is impregnated by the consolidating composition. Impregnation may be performed using a brush or by spreading or by immersion in a bath, possibly under a vacuum, or indeed by injecting the consolidating composition while applying a vacuum. In the last case, as shown in FIG. 2, the assembly constituted by the preform 100, the mandrel 102, and the diaphragm 104 may be placed in a jacket 106. The consolidating composition is injected, while the volume inside the jacket 106 is connected to a vacuum source. Depending on the degree of deformability of the diaphragm 104, the fiber preform may be simultaneously compressed so as to increase the volume percentage of fibers in the preform.

After optional drying (step 150) and curing of the ceramic precursor resin contained in the consolidating composition (step 160), the fiber preform may be removed from the conformation tooling prior to pyrolysis and CVI densification steps 170 and 180 similar to steps 80 and 90 of the method of FIG. 1.

In the description above, consideration is given to the fabrication of CMC parts.

However, the method of the invention may equally well be used for fabricating parts made of C/C composite material. Under such circumstances, a fiber texture is made of carbon fibers and the consolidating composition contains a carbon precursor in liquid form, typically a resin, possibly diluted in a solvent, and solid fillers that are preferably in the form of carbon powder, e.g. diamond fillers or carbon black, it being understood that solid fillers in the form of ceramic powder(s) could optionally be used. The consolidating composition may also include a dispersant for the carbon powder and optionally a solvent for the dispersant.

Carbon precursor resins are well known. By way of example, it is possible to use a resin selected from epoxy, furanic, or phenolic resins. Pitch may also be used as a carbon precursor.

As above, the solid fillers present mean grain size of less than 200 nanometers, and preferably less than 100 nanometers. In addition, the quantities of carbon precursor and of solid fillers in the consolidating composition are also selected so that after the carbon precursor has been pyrolyzed, the volume percentage of the solid residue of pyrolysis of said precursor in the consolidated fiber preform lies in the range 3% to 10%, preferably in the range 3% to 6%, with the volume percentage of solid fillers in the preform lying in the range 0.5% to 5%, and preferably in the range 0.5% to 3%.

An interphase may be provided between the fibers of the fiber texture and the matrix of the CMC or C/C material. As already known, in a CMC material, such an interphase may have a function of reducing brittleness by being a material that is capable of relaxing stresses at the bottoms of cracks that reach the interphase through the matrix, thereby preventing or retarding the propagation of cracks through the fibers, which has the effect of rupturing the fibers. By way of example, the material constituting the interphase is pyrolytic carbon (PyC), boron nitride (BN), or boron-doped carbon (BC, e.g. with 5% to 20% atomic of B, the balance being C). In a C/C composite material, an interphase may be useful for improving ability to withstanding oxidation, in particular when the interphase contains boron, such as BN or BC.

Advantageously, the interphase is formed by a first layer of small thickness, e.g. of thickness lying in the range 10 nanometers (nm) to 100 nm, or indeed in the range 10 nm to 50 nm, that is deposited by CVI on the fibers of the fiber texture, prior to impregnation with the consolidating composition, and a second layer, e.g. having thickness of not less than 100 nm, that is deposited after pyrolysis of the ceramic precursor or the carbon precursor in the consolidating composition and prior to densification. The small thickness of the first interphase layer serves to conserve sufficient capacity for deformation in the fiber texture to obtain a fiber preform having the desired shape. The second interphase layer covers the fibers of the fiber preform and the grains of the residue of the consolidating composition after pyrolysis. The two interphase layers are not necessarily made of the same material. The steps of pyrolysis, forming the second interphase layer, and CVI densification may follow on one from the other in the same oven.

Making an interphase in this way as two layers is described in the Applicant's French patent application filed on Jul. 21, 2008 under the number 08 54937, the content of which application is incorporated herein by way of reference.

Implementation examples of a method of the invention are described below.

EXAMPLE 1

Evaluation of the Level of Consolidation

Fiber textures of C fibers were made by multilayer 3D weaving of C fiber yarns supplied by the Japanese supplier Tenax under the name "NM5 Roving HTS Fibers". The resulting C fabrics presented thickness of about 4 millimeters (mm). They were heat-treated under a vacuum at a temperature of about 1600° C. for about 30 minutes (min).

A first interphase layer of PyC with thickness of about 30 nm was deposited by CVI on the fibers of the fiber texture, using a reaction gas containing methane.

Consolidating compositions were made containing a SiC precursor in the form of a polysiloxane resin supplied by the German supplier Wacker Chemie under the reference "MK" and $B_4C$ powder having mean grain size of about 150 nm, or SiC powder having mean grain size of about 50 nm, by proceeding as follows:

dispersing the $B_4C$ powder or the SiC powder in a mixture of a dispersant constituted by polyethylene imine and a solvent for the dispersant (ethanol);

adding a solvent for polysiloxane resin, specifically methyl ethyl ketone (MEK); and adding the polysiloxane resin.

Various consolidating compositions were made with quantities of polysiloxane resin and of $B_4C$ or SiC powder such that after the fiber preforms were formed and pyrolyzed, the volume percentages in the preforms consolidated with SiC from the precursor resin and $B_4C$ or SiC powder were as specified in Table I below. The dilution ratio x of the polysiloxane resin is also given, where x is equal to $$\frac{w_r}{(w_r + w_s)}$$

where $w_r$ is the weight of the resin and $w_s$ is the total weight of the solvent.

After the C fabrics were impregnated with the consolidating compositions and dried, the SiC precursor resin was pre-cured by raising the temperature to about 140° C. for about 2 hours (h).

After the preform had been shaped, resin curing was terminated by raising the temperature to about 200° C. for about 20 h, and the cured resin was pyrolyzed in an oven by raising the temperature to about 900° C. for about 3 h.

The fiber preforms consolidated by the SiC residue of pyrolysis filled with the $B_4C$ or SiC powder were then examined.

For the various consolidation compositions used, Table I gives the dilution ratio, the volume percentage of the ceramic solid residue, the nature and the grain size of the ceramic powder, volume percentages of the powders, the weight yield of pyrolysis (percentage by weight after pyrolysis compared with before pyrolysis and after curing) and the consolidation level obtained. The consolidation level was evaluated as follows:

−1: consolidation just satisfactory
0: good consolidation
+1: very good consolidation
+2: preform very rigid, consolidation effective but could be considered as being excessive.

By way of comparison, the pyrolysis weight yield and consolidation level obtained by consolidation using a prior art liquid technique are given in the first line of the table, for a similar preform obtained using the same C fabric, the consolidating composition used differing from the other compositions in that it did not include any solid fillers and in that the quantity of SiC precursor resin included was such that the volume percentage of pyrolysis SiC residue in the consolidated preform was 12%.

| Dilution ratio $\frac{w_r}{(w_r + w_s)}$ | Ceramic residue volume % | Powder nature and grain size | Powder volume % | Pyrolysis yield | Consolidation level |
|---|---|---|---|---|---|
| 6/10 | 12 | X | 0 | 80% | −1 |
| 2/10 | 4 | B$_4$C 150 nm | 1 | >80% | 0 |
| 2.5/10 | 5 | B$_4$C 150 nm | 0.5 | >80% | −1 |
| 2/10 | 4 | SiC 50 nm | 1 | >80% | +1 |
| 2.5/10 | 5 | SiC 50 nm | 0.5 | >80% | 0 |
| 3/10 | 6 | SiC 50 nm | 2 | >80% | +1 |
| 4/10 | 10 | B$_4$C 150 nm | 2 | >80% | +2 |
| 3/10 | 6 | B$_4$C 150 nm | 2 | >80% | +1 |
| 1.5/10 | 3 | B$_4$C 150 nm | 2 | >80% | 0 |

It should be observed that the consolidation level obtained with consolidating compositions of the invention is very satisfactory, i.e. it allows the preform to be manipulated without deforming, even with consolidating compositions having SiC residue volume percentages well below that obtained with the prior art composition.

EXAMPLE 2

A CMC part was made as follows.

A fiber texture of C fibers was obtained by multilayer 3D weaving of C-fiber yarns supplied by the Japanese supplier Tenax under the name "NM5 Roving HTS Fibers". The fabric obtained had thickness of about 4.5 mm. It was heat-treated under a vacuum at a temperature of about 1600° C. for about 30 min.

A first PyC interphase layer with thickness of about 30 nm was deposited by CVI on the fibers of the fiber texture, using a reaction gas containing methane.

A consolidating composition was made containing an SiC precursor in the form of polysiloxane resin supplied by the German supplier Wacker Chemie under the reference "MK", and SiC powder having a mean grain size of about 50 nm, by proceeding as follows:

- dispersing the SiC powder in a dispersant mixture constituted by polyethylene imine and a solvent for the dispersant (ethanol);
- adding a solvent for polysiloxane resin, specifically MEK; and
- adding polysiloxane resin with a dilution ratio of 3/10.

After forming the preform, the resin was cured by raising the temperature to about 200° C. for about 20 h, and the cured resin was pyrolyzed in an oven by raising the temperature to about 900° C. for about 3 h.

The preform as consolidated in this way was densified by a ceramic matrix by CVI after using CVI to form a second PyC interphase layer of thickness equal to about 200 nm and obtained by CVI.

The pyrolysis and densification steps followed on one from the other in the same oven.

The quantity and the constitution of the consolidating phase was selected so as to leave, after pyrolysis, a consolidating solid phase in which the ceramic derived from the polysiloxane precursor occupied a volume in the consolidated preform representing a volume percentage of about 6% and the SiC powder occupied a volume representing a volume percentage of about 2%.

Morphological analyses were performed in zones situated at the edge and in the center (core) of the material. FIG. 4 shows images obtained, and including two images at different scales for the center zone.

It can be seen that the consolidating phase (dark gray) is absent inside the yarns, but that the ceramic matrix obtained by CVI (paler color) is present therein in significant quantity. The darker portions are residual pores.

EXAMPLE 3

Comparative

By way of comparison, the procedure was as in Example 2, but using a consolidating composition not including any solid fillers and such as to leave a consolidating solid phase occupying a volume in the preform that represented a volume fraction of 12% as in the prior art.

Figure 5:
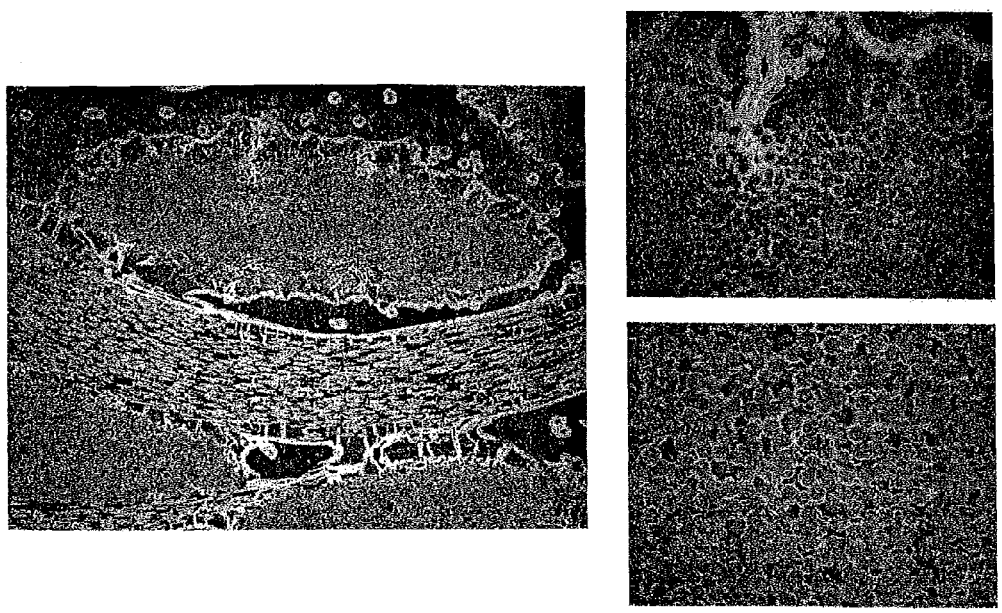
FIG. 5 shows optical images in the core of a sample of CMC material obtained by a method of the prior art.

Morphological analyses were performed in zones situated in the center (core) of the material. FIG. 5 shows the images obtained at different scales.

The presence of the consolidating phase can be seen inside the yarns with a smaller presence of ceramic matrix obtained by CVI, in comparison with FIG. 4.

The invention claimed is:

1. A method of fabricating a thermostructural composite material part, the method comprising:
   providing a fiber texture formed of yarns or tows,
   impregnating the yarns or tows with a consolidating composition in liquid form containing a carbon- or ceramic-precursor and refractory solid fillers in the form of a powder of mean grain size less than 200 nanometers,
   forming a fiber preform with said impregnated fiber texture and holding the fiber preform in a desired shape,
   pyrolyzing the carbon- or ceramic-precursor to obtain a fiber preform consolidated by a consolidating solid phase comprising the carbon or ceramic derived from the precursor and the refractory solid fillers, the impregnating being carried out such that the carbon or ceramic derived from the precursor occupies a volume representing 3% to 10% of the apparent volume of the preform and the refractory solid fillers occupy a volume representing 0.5% to 5% of the apparent volume of the preform, and
   densifying the consolidated fiber preform with a matrix by chemical vapor infiltration.

2. A method according to claim 1, wherein the volume percentage in the preform of the carbon or ceramic of the consolidating phase derived from the precursor lies in the range 3% to 6%.

3. A method according to claim 1, wherein the volume percentage in the preform of the solid fillers of the consolidating phase lies in the range 0.5% to 3%.

4. A method according to claim 1, wherein the solid fillers used present mean grain size of less than 100 nanometers.

5. A method according to claim 1, wherein the fiber preform is made by conforming the fiber texture formed of yarns or tows and impregnated by the consolidating composition.

6. A method according to claim 5, wherein the carbon- or ceramic-precursor in the consolidating composition is a resin, and the fiber preform is conformed after pre-curing the resin.

7. A method according to claim 1, for fabricating a part out of a ceramic matrix composite material, wherein the solid fillers comprise a powder of at least one compound selected from SiC, TiC, $B_4C$, and BN.

8. A method according to claim 1, wherein an interphase layer is formed by chemical vapor infiltration on the fibers of the yarns or tows prior to impregnation with the consolidating composition.

9. A method according to claim 1, wherein a first interphase layer is formed by chemical vapor infiltration on the fibers of the yarns or tows prior to impregnation by the consolidating composition, and a second interphase layer is formed after consolidation of the fiber preform and prior to densification of the consolidated fiber preform.

\* \* \* \* \*